United States Patent [19]

Banks

[11] Patent Number: 5,579,302
[45] Date of Patent: Nov. 26, 1996

[54] METHOD AND APPARATUS FOR REGULATING VIRTUAL-CHANNEL CELL TRANSMISSION

[75] Inventor: David Banks, Redland, United Kingdom

[73] Assignee: Hewlett-Packard Company, Palo Alto, Calif.

[21] Appl. No.: 498,535

[22] Filed: Jul. 5, 1995

[30] Foreign Application Priority Data

Aug. 31, 1994 [EP] European Pat. Off. .............. 94306389

[51] Int. Cl.$^6$ .................................................. H04L 12/56
[52] U.S. Cl. ............................. 370/17; 370/60.1; 370/84; 370/94.2
[58] Field of Search ................................. 370/13, 17, 60, 370/60.1, 61, 79, 84, 85.7, 94.1, 94.2, 95.1

[56] References Cited

U.S. PATENT DOCUMENTS

| | | | |
|---|---|---|---|
| 5,390,184 | 2/1995 | Morris | 370/94.2 |
| 5,392,280 | 2/1995 | Zheng | 370/60 |
| 5,448,559 | 9/1995 | Hayter et al. | 370/60.1 |
| 5,455,825 | 10/1995 | Lauer et al. | 370/60 |

FOREIGN PATENT DOCUMENTS 0596624   5/1994   European Pat. Off. .

OTHER PUBLICATIONS

Sigcomm '91, vol. 21, No. 4, 3 Sep. 1991, Zurich pp. 113–121 H. Yhang, S. Keshav 'Comparison of Rate–Based Service Disciplines.' *p. 115, left col., line 25–right col., line 5*.

Computer Communications Review, vol. 21, No. 4, Sep. 1991, New York US, pp. 285–293, J. Hyman, A. A. Lazar, G. Pacifici 'MARS: The Magnet II Real–Time Scheduling Algorithm', *p. 287, left col., line 38–right col., line 41*.

*Primary Examiner*—Alpus H. Hsu

[57] ABSTRACT

In order to schedule the transmission onto a link of cells associated with different virtual channels, a transmission schedule is set up associating virtual channels with respective transmission time slots. Each time a cell is sent, the corresponding virtual channel is re-allocated to a time slot that is offset from the current one by an amount dependent on the desired rate of transmission. This desired rate is specified for each virtual channel in a corresponding transmission rate indicator including a fixed integer part, a fixed fractional part, and a variable accumulation part. The fixed parts of the indicator define the desired rate whilst the accumulation part is used in calculating each successive offset. More particularly, to determine the offset of the time slot next to be allocated to a virtual channel, the three parts of the corresponding transmission rate indicator are added up and the integer component of the result is used as the offset, the fractional remainder being stored back to the accumulation part of the transmission rate indicator. This arrangement permits a fine control to be achieved on the average transmission rate. A similar approach can be used to control the rate of credit generation in systems where transmit credits are used to regulate cell transmission.

12 Claims, 5 Drawing Sheets

METHOD AND APPARATUS FOR REGULATING VIRTUAL-CHANNEL CELL TRANSMISSION

FIELD OF THE INVENTION

The present invention relates to a method and apparatus for regulating the transmission of cells onto a link, the cells being associated with a plurality of different virtual channels; in particular, but not exclusively, the present invention relates to the regulation of cell transmission in ATM systems providing guarenteed bandwidth services.

BACKGROUND OF THE INVENTION

ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the Cells are fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node.

The virtual circuit label for an ATM cell on a particular link is formed by a Virtual Path Indicator (VPI) and a Virtual Channel Indicator (VCI) present in the cell header. This label forms the basis on which the cell is routed at the next network node it encounters. Generally, in ATM parlance, a virtual circuit is called a "Virtual Channel" and the VPI fields can be thought of as identifying a group of virtual channels on a link whilst the VCI identifies a particular virtual channel in that group.

ATM technology is finding increasing popularity because it can offer an acceptable compromise in combining timeliness characteristics (normally associated with circuit switching technologies) and statistical advantage (associated with packet switching technologies). ATM holds out the prospect of a single transfer mode technology for carrying all traffic types, including voice, entertainment services, or computer traffic. This flexibility of use is made available by offering different qualities of service (QOS) to the user, the chosen QOS then attaching to the virtual channel used for the communication. The two main types of QOS are:

- a "best efforts" QOS where the ATM system does its best to deliver cells of the virtual channel concerned subject to first satisfying priority services—in other words, the system makes no guarantee regarding delivery rate;
- a "guaranteed bandwidth" QOS where the ATM system guarantees a certain bandwidth to the virtual channel concerned. This guarantee is generally not a hard one—in other words, the term "guaranteed bandwidth" is intended to indicate a type of service that is offered as normally providing a particular transmission bandwidth rather than meaning that the technical service providing means will always meet the service level subject of the guarantee.

Where multiple guaranteed bandwidth virtual channels are simultaneously operating over the same link, it becomes necessary to effect some sort of scheduling between channels having cells to transmit; a number of scheduling arrangements are known including a simple round-robin approach where each channel is taken in strict rotation.

It is also necessary to ensure that a channel does not take up available bandwidth to a level way above its guarantee and to this end, it is well known to effect traffic shaping that limits the transmission rate of a channel. Many of the schemes for effecting traffic shaping utilise a so-called "leaky bucket" algorithm by which transmission credits are built up at a steady rate and credits are then consumed as cells are sent. By placing a maximum size on the credit bucket, a limit can be placed on any cell burst resulting frown the sudden availability of cells for a channel on which credit has been building for some time.

It is possible to combine scheduling and traffic shaping. According to one known approach, a fixed-size circular list is provided and each channel is inserted one or more times in fixed locations in the list; taking each list entry in turn provides both scheduling and a fixed bandwidth for each channel, this bandwidth being proportional to the number of times a channel is present in the list. This approach, however, lacks flexibility.

In another approach, described in our co-pending European Patent Application No. 94410045.2 (corresponding to U.S. patent application Ser. No. 08/453,657 filed May 30, 1995 entitled "Method and Apparatus for Regulating Virtual Channel Cell Transmission"), a fixed-size circular list is again used to hold in its slots the identity (as specified by a virtual channel number or "VCN") of each channel on which cells are to be sent; however, the assignment of VCNs to slot is not permanent but changes dynamically. More particularly, in operation the list is advanced through slot by slot and each VCN encountered is processed to cause the transmission of a cell for the corresponding virtual channel; at the same time, the list is updated by freeing the current slot and inserting back into the list any VCN that occupied the slot if that VCN relates to a virtual channel with another cell to transmit. This insertion is effected at an offset from the slot previously occupied by the VCN, dependent on the transmission rate required for the virtual channel concerned (and subject to a conflict resolution procedure). Whilst this approach is more flexible than that previously described, the use of an offset of fixed value has the effect that only certain transmission rates can be achieved—for example with an offset of two slots, a channel will occupy half the available bandwidth whilst with an offset of one, it will occupy all the bandwidth (assuming it is allowed to do so).

It is an object of the present invention to permit finer control of transmission rates than possible in the arrangements referred to above.

SUMMARY OF THE INVENTION

According to one aspect of the present invention, there is provided a method of controlling the rate of transmission of cells onto a link, the cells being associated with a plurality of different virtual channels and being transmitted onto the link in respective transmission time slots according to a transmission schedule associating transmission time slots and virtual channels; the method comprising the steps of:
(a) providing for each virtual channel a transmission rate indicator having a fixed integer part, a fixed fractional part, and a variable accumulation part;

(b) each time a cell is transmitted on the link in respect of a particular virtual channel according to the transmission schedule, determining for that virtual channel, at least in the case that another cell is available for sending on that channel, the next time slot for transmitting a cell for the channel, this determination involving:

adding together the three parts of the transmission rate indicator for the channel concerned to produce a result with an integer component and a fractional remainder;

using the integer component of the result to set said offset; and storing the fractional remainder as the accumulation part of the transmission rate indicator for the virtual channel concerned; and (c) updating the transmission schedule by using the offset determined in step (b), in determining the next time slot in which a cell is to be transmitted for the virtual channel concerned, and then associating that time slot with that channel.

As a result of this approach, it is possible to achieve a finer control of transmission rate. Thus, for example, where it is desired to allocate two-thirds of the link bandwidth to a particular virtual channel, this can be done by setting the integer part of the transmission rate indicator to one and the fractional part to one half; the slot offset value will then alternate between one and two so that for every three time slots, two will be used for the virtual channel concerned.

Preferably, the integer and fractional parts of each transmission rate indicator are directly stored as numbers representing whole and partial time slots respectively. However, it is also possible to store the integer and fractional parts jointly in the form of a number representing the transmission rate it is desired to achieve, this number being converted into units and fractions of time slots when determining the slot offset.

In step (c), should the slot indicated by the offset determined in step (b) be already associated with a channel, then a conflict resolution procedure is entered into (for example, the next free slot may simply be taken or a more complex procedure employed based on priorities pre-assigned to the channels).

The present invention also encompasses the provision of apparatus implementing the foregoing method. More particularly, according to the present invention there is provided apparatus for transmitting a stream of cells onto a link, the cells being associated with a plurality of different virtual channels each of which is identified in the apparatus by a respective virtual-channel identifier, herein "VCN"; the apparatus including a scheduler for scheduling the transmission of cells of each virtual channel, the scheduler comprising:

storage means for storing for each virtual channel a transmission rate indicator having a fixed integer part, a fixed fractional part, and a variable accumulation part;

list means for maintaining a list having a number of entry slots each capable of storing a single VCN, the list containing the VCNs of virtual channels with cells to transmit;

control means for advancing through the list slot by slot and, if a VCN is found in the current slot of interest, responding thereto by transmitting a cell of the corresponding virtual channel, the control means being further operative to remove the VCN, if any, in the current slot of interest, and to re-insert the VCN in a slot offset ahead of the current slot by an predetermined offset amount, the control means including determination means for determining said offset amount, the determination means comprising:

means for adding together the three parts of the transmission rate indicator for the channel concerned to produce a result with an integer component and a fractional remainder, means for setting the offset amount in dependence on the integer component of the result, and means for storing the fractional remainder back into the storage means as the accumulation part of the transmission rate indicator for the virtual channel concerned;

the control means further including conflict resolution means for resolving conflicts arising from the slot that is offset from the current one by said predetermined offset, being already occupied by a VCN.

The same general concept may also be applied to credit generation in systems where cell transmission is dependent on the availability of transmit credit for the virtual channel concerned; in this case, the rate of credit generation may be controlled in a manner similar to that disclosed above for controlling cell transmission rate. Thus, according to further aspect of the present invention, there is provided a method of controlling the rate of transmit credit generation in a system in which cells associated with a plurality of different virtual channels are transmitted onto a link in respective time slots, the transmission of cells for a particular virtual channel being dependent on the availability of transmit credits for that channel; the method comprising the steps of:

(a) providing for each virtual channel a credit-generation rate indicator having a fixed integer part, a fixed fractional part, and a variable accumulation part;

(b) maintaining a list having entry slots for storing identifiers of the virtual channels to which credit is to be allocated; and (c) advancing through said list at a predetermined slot rate and each time a said identifier is encountered, increasing the transmit credit level of the corresponding virtual channel and reinserting said identifier in the list at a forward offset determined according to the following sub-steps:

adding together the three said pans of the credit-generation rate indicator for the channel concerned to produce a result with an integer component and a fractional remainder;

using the integer component of the result to set said offset; and storing said fractional remainder as the said accumulation part of the said credit-generation rate indicator for the virtual channel concerned.

a conflict resolution procedure being carried out in the event that the position in said list indicated by said forward offset is already occupied.

It is also possible to control the rate of credit generation, not by varying the interval between the credit generation events, but by varying the size of credit increment at each such event. Thus according to a still further aspect of the present invention, there is provided a method of controlling the rate of transmit credit generation in a system in which cells associated with a plurality of different virtual channels are transmitted onto a link in respective time slots, the transmission of cells for a particular virtual channel being dependent on the availability of transmit credits for that channel; the method comprising the steps of:

(a) providing for each virtual channel a credit-increment size indicator having a fixed integer part, a fixed fractional pan, and a variable accumulation part; and (b) at regular intervals, incrementing the transmit credit level of each virtual channel by a respective increment amount determined for that incrementing operation according to the following sub-steps:

adding together the three said parts of the credit-increment size indicator for the channel concerned to produce a result with an integer component and a fractional remainder;

using the integer component of the result to set said increment amount; and storing said fractional remainder as the said accumulation part of the said credit-increment size indicator for the virtual channel concerned.

In more general terms, the present invention may be expressed as a method of regulating the transmission of cells onto a link, the cells being associated with a plurality of different virtual channels, the method comprising the steps of:

(a) providing for each virtual channel a control data item having a fixed integer part, a fixed fractional part, and a variable accumulation part;

(b) periodically determining for each virtual channel a control number, this determination involving:

adding together the three said parts of the control data item for the channel concerned to produce a result with an integer component and a fractional remainder;

using the integer component of the result to set said control number; and storing said fractional remainder as the said accumulation part of the said control data item for the virtual channel concerned; and (c) regulating cell transmission for the virtual channel concerned according to the value of the said control number determined in step (b) for that virtual channel.

BRIEF DESCRIPTION OF THE DRAWINGS

A guaranteed-bandwidth scheduler embodying the invention and for scheduling the transmission of cells of guaranteed-bandwidth virtual channels, will now be particularly described, by way of non-limiting example, with reference to the accompanying diagrammatic drawings in which.

BEST MODE FOR CARRYING OUT THE INVENTION

The guarenteed bandwidth scheduler now to be described with reference to FIGS. 1 to 4 forms the subject matter of our co-pending European Patent Application No. 94410045.2 filed 28th June 1994. The application of the present invention to this scheduler is described with reference to FIG. 5.

Figure 1:
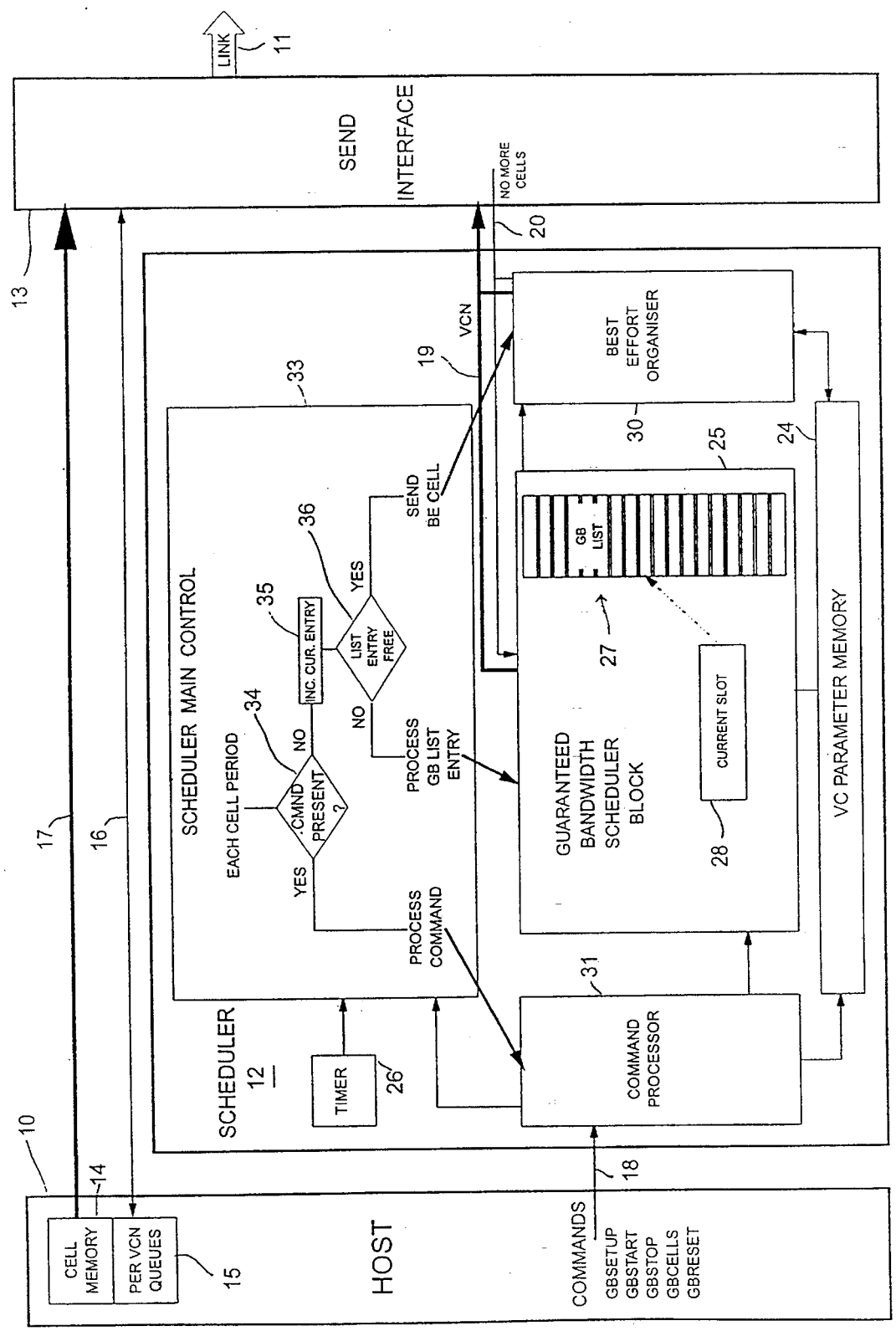
FIG. 1 is a functional block diagram of a scheduler for scheduling the transmission of cells form a host system onto a link via a send interface.

FIG. 1 shows a host system 10 arranged to transmit ATM cells associated with a plurality of different virtual channels onto a link 11 via a link adaptor comprising a scheduler 12 and a send interface 13.

Quality of Service

The host system 10 and link adaptor 12, 13 are arranged to handle virtual channels with three different qualities of service namely:

a 'best efforts' (BE) quality of service for which no guarantee is given as to bandwidth availability;

a first 'guaranteed bandwidth' (GB0) quality of service for which the scheduler 12 seeks to guarantee transmission of cells at a particular rate subject to cell availability, no credit being allowed for periods when cells are not available; and a second 'guaranteed bandwidth' (GB1) quality of service for which the scheduler 12 seeks to guarantee transmission of cells at a particular rate ('sustain' rate) when cells are continuously available but for which the scheduler will also seek to give credit for periods when cells are not available by accumulating credit tokens during such periods and then when cells are available effecting transmission at a higher rate ('peak' rate) according to the credit available, up to a predetermined number of cells (the 'burst' limit).

The present invention is concerned with the scheduling of guaranteed bandwidth virtual channels (that is, virtual channels with either a GB0 or GB1 quality of service) and accordingly a detailed description will not be given herein as to how best effort virtual channels are organised for transmission other than to describe how their scheduling is made subservient to the scheduling of guaranteed bandwidth (GB) virtual channels.

With regard to the scheduling of GB virtual channels, a priority level is allocated to each such channel from a limited number of possible levels (in the present example, there are three possible levels, namely low, medium and high priority levels). As will be more fully described hereinafter, these priority levels are used to assist in resolving scheduling conflicts.

It is also worth noting at this stage that each GB virtual channel can be stopped (that is, suspended rather than taken down) and started; furthermore, even when not stopped, a virtual channel may not be actively running as it may be waiting for cells to become available. All GB virtual channels are therefore considered by the GB scheduler to be described hereinafter to have three possible states, namely:

a STOP state in which the virtual channel is suspended;

a WAIT state in which the virtual channel is not suspended but is awaiting the arrival of cells to send, and;

a RUN state in which the virtual channel is not suspended and has cells to send.

In addition, GB1 virtual channels have a fourth state:

an ACCUM state in which the virtual channel is not suspended but has no cells to send and is accumulating credits to enable it to transmit at its peak rate when cells are available.

These states are shown in the state transaction diagram of FIG. 3 which will be described in more detail hereinafter (the same diagram being usable for both GB0 and GB1 virtual channels).

General Arrangement

Returning to a consideration of FIG. 1, within the host system 10 and link adaptor each virtual channel is identified by a respective virtual channel number (VCN).

The host system 10 is responsible for controlling the setting up and taking down of virtual channels. For each virtual channel the host system 10 stores the cells to be transmitted in a cell memory 14 and keeps a respective queue of cell pointers for these cells in a queue block 15. When the queue block 15 is prompted with a VCN, it takes the head pointer from the queue of cell pointers for the virtual channel identified by that VCN, and uses the pointer to access the corresponding cell in the memory 14. This cell is then output on a bus 17.

The host system 10 keeps the scheduler 12 informed of which virtual channels currently exist, whether or not they are stopped, and when more cells become available for a virtual channel previously awaiting cells. This information is transferred using commands passed over a command interface 18. For GB virtual channels, these commands comprise:

GBSETUP—notifies the scheduler of a new virtual channel and passes it the relevant quality of service parameters for the channel;

GBSTART—enables transmission for a specified virtual channel;

GBSTOP—disables (stops) transmission for a specified virtual channel;

GBCELLS—notifies the scheduler that more cells have become available for transmission;

GBRESET—effectively removes a virtual channel from the scheduler.

Similar commands also exist for BE virtual channels; indeed, the commands are generally the same except for the contents of the SETUP command. However, as the present description is concerned with GB virtual channels, the commands for BE channels will not be further considered.

The scheduler 12 is responsible for determining the identity of the virtual channel for which a cell is next to be transmitted on the link 11. The schedule 12 identifies the virtual channel to the send interface 13 by passing it the VCN of the virtual channel over connection 19.

The send interface 13 uses this VCN to access the queue block 15 of the host system 10 over a connection 16, resulting in the output on the bus 17 of the next cell to be sent on the virtual channel concerned. The send interface then transmits the cell received over bus 17 onto the link 11. If no more cells are available for the virtual channel concerned, this is indicated to the send interface 13 by the queue block 15 and the send interface 13 in turn informs the scheduler 12 over line 20.

The Scheduler 12

Considering next the scheduler 12 in more detail, this includes a VC parameter memory 24 for storing quality of service parameters of each GB virtual channel notified to the scheduler by the GBSETUP command and not yet removed by the GBRESET command. Details of these parameters will be given hereinafter with reference to FIG. 3.

The main functional block of the scheduler 12 is a guaranteed bandwidth (GB) scheduler block 25 operative to determine on which GB virtual channel, if any, a cell should be transmitted in a current cell transmit period. The cell period timing is determined for the scheduler 12 by a timer 26. The key elements of the GB scheduler block 25 are a circular list or table 27 containing a predetermined number of entry slots each capable of holding a single VCN, and a current-slot tracker 28 keeping track of the list entry slot currently of interest. The current-slot tracker is advanced at the start of every cell transmit period to point to the next entry slot of the list 27. Every GB virtual channel with a cell to send has its VCN inserted in a respective entry slot of the list 27, there being only one entry per virtual channel. As each table entry slot becomes the current slot, if it contains the VCN of a virtual channel with cells to send, then this VCN is output from the scheduler 12 to the send interface 13 to cause a cell to be sent on that virtual channel; at the same time, the VCN is moved forward in the table by a number of slots dependent on the transmission rate guarantee, as will be more fully described hereinafter.

If the current slot of the table 27 does not contain the VCN of a virtual channel with cells to send, then the scheduler 12 is arranged to cause the sending of a cell on a BE virtual channel. This is implemented by activating a best effort organiser block 30 for the relevant cell transmit period, this block determining the BE virtual channel on which a cell is to be sent and outputting the VCN of this channel to the send interface 13.

Of a greater priority in the scheduler 12 than the GB scheduler block 25, is a command processor block 31. If a command is awaiting processing, then the next one (or more) cell periods are dedicated in the scheduler 12 to this processing: the cell periods concerned are not therefore cell transmit periods and the current-slot tracker 28 in the GB scheduler block 25 is accordingly not advanced.

A main control block 33 determines which of the three blocks 31, 25, 30 (command processor 31, GB scheduler block 25, best effort organiser 30) is active in each cell period. Thus, at the start of each cell period (indicator by the main timer 26), the main control block 33 determines whether .a command is awaiting processing by the command processor 31—see block 34 of the small flow chart contained within block 33 in FIG. 1. If a command is awaiting processing, the command processor 31 is activated for the current cell period. However, if no command is waiting to be processed, the main control block 33 causes the current slot tracker 28 to advance one slot in the list 27 (box 35); thereafter, if the new current slot is occupied, control passes to the GB scheduler 25, otherwise, control passes to the best effort organiser 30 (box 36).

The Components for the GB Scheduler 25

Figure 2:
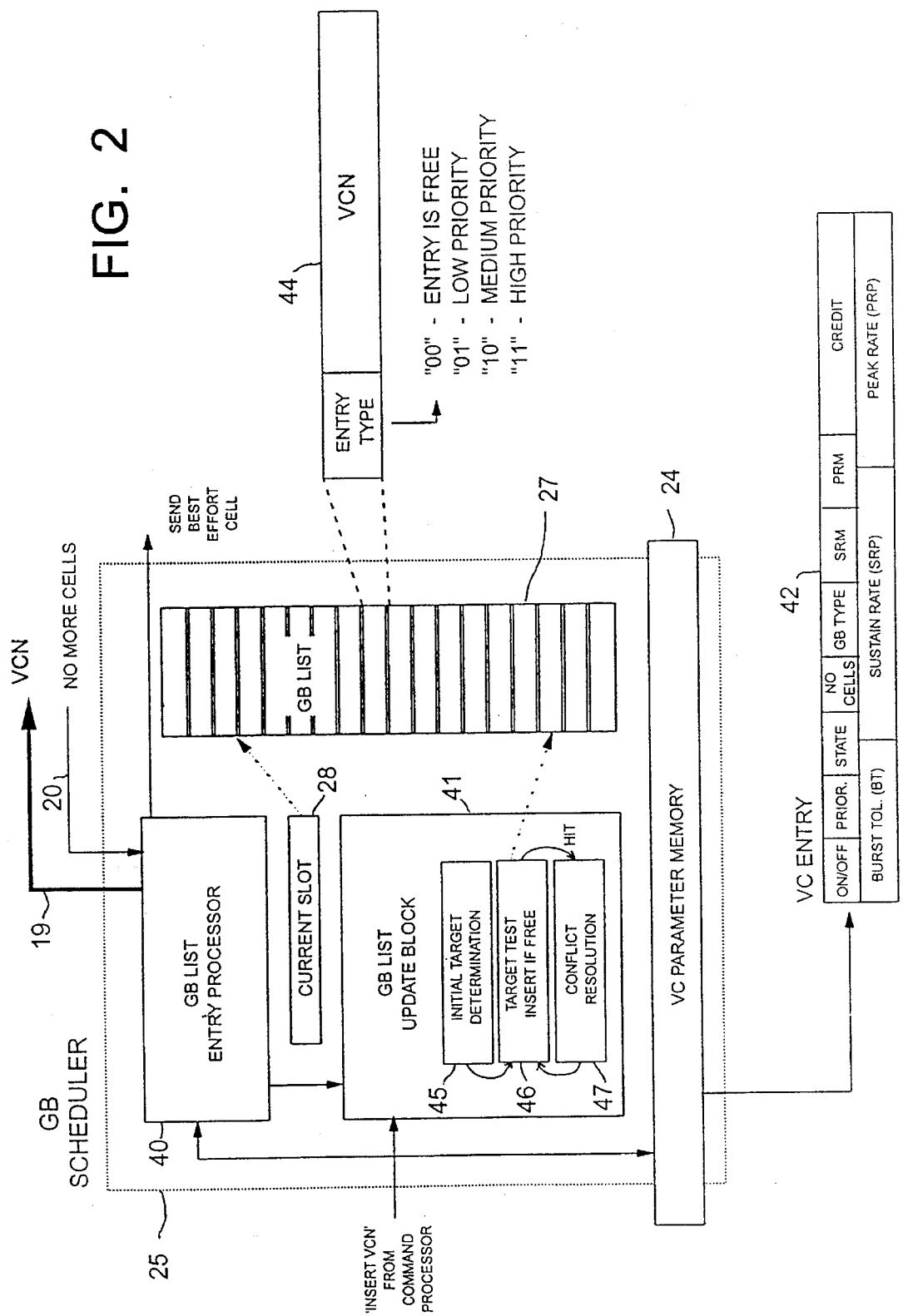
FIG. 2 is a functional block diagram of a guaranteed bandwidth schedular block of the FIG. 1 scheduler.

FIG. 2 shows the structure of the GB scheduler 25 in more detail. In addition to the circular list 27 and current-slot tracker 28, the GB scheduler 25 comprises a list entry processor 40 and a list update block 41.

The scheduler 25 may also conceptually be considered as including the VC parameter memory 24, at least to the extent that the latter holds data on GB virtual channels. For each GB virtual channel, the memory 24 maintains an entry 42 accessible by using the VCN of the virtual channel concerned. Each GB entry 42 comprises the following fields:

ON/OFF—this is a flag field set to 0 ('OFF') by the command processor 31 to stop the virtual channel concerned.

PRIORITY—this field indicates the priority level (low medium or high) of the GB virtual channel;

STATE—this field indicates the current state of the virtual channel (STOP, WAIT, RUN and, for GB1 channels, ACCUM);

NO-CELLS—this field is used to indicate whether cells are awaiting transmission for a virtual channel;

GBTYPE—indicates whether the virtual channel is of type GB0 or GB1;

PEAK RATE—this field contains the peak rate parameter (PRP) that determines the transmission rate for GB0 virtual channels and for GB1 channels with credit available;

PRM—this field specifies how the PRP field should be interpreted (applicable where more than one format is available for specifying peak rate);

SUSTAIN RATE—this field contains the sustain rate parameter (SRP) that determines the transmission rate for GB1 virtual channels that have no credit for sending at their peak rates; the SRP also determines the rate at which credit can be accumulated by a GB1 virtual channel awaiting cells to send;

SRM—this field specifies how the SRP should be interpreted (applicable where more than one format is available for specifying sustain rate);

CREDIT—this field is used to keep a count of the credit accumulated by a GB1 virtual channel whilst awaiting a cell to send;

BURST TOL—this field specifies the burst tolerance (BT) of a GB virtual channel, that is, the maximum number of cells that a GB1 virtual channel may send consequently at peak rate.

Each entry 42 is created in response to a GBSETUP command being received by the command processor 31, and is removed in response to a GBRESET command being received by the command processor 31. During the currency of a GB virtual channel, the fields ON/OFF, STATE and NO-CELLS are modifiable by the command processor 31 and/or the list entry processor 40.

With reference to the circular list 27, the size (number of slots N) of this list is related to the minimum transmission rate that is to be supported. This is because, as already mentioned, if the current slot contains a valid entry relating to a GB virtual channel with cells to send, then after processing of the entry, the virtual channel (that is, its VCN) is moved to a new slot in the list, offset from the current slot by an amount dependent on the required transmission rate for the channel; the maximum displacement between occurrences of a VCN will therefore correspond to the size N of the list. As a result, the minimum transmission rate supportable is ($1/N$) times the link transmission rate, which leads to:

$$N = \frac{\text{link transmission rate}}{\text{minimum transmission rate}}$$

For example for a SONET OC3c link (transmission rate 149.76 Mbps) and a minimum transmission rate requirement of 64 kbps, the list 27 should have 2340 slots.

Shown in FIG. 2 at 44 is the format of a list slot entry. As can be seen, an entry 44 comprises two fields, namely a type field and a field holding the VCN of the virtual channel to which the entry relates. In fact, every slot contains an entry but only those with a type field of a value other than '00' are considered occupied—if the type field is '00', the slot is taken to be 'free' and the VCN field invalid. The values of the type other than '00' are used to specify the priority level of the virtual channel indicated by the VCN field ('01' indicates low priority, '10' medium priority, and '11' high priority).

The list update block 41 serves to insert a virtual channel (identified by its VCN) into the list 27 at the request either of the command processor 31 or of the list entry processor 40. This insertion is effected at an offset from the current list slot dependent on the transmission rate of the channel concerned, this rate being specified by the peak rate parameter PRP for GB0 virtual channels and either the peak rate parameter PRP or the sustain rate parameter SRP for GB1 virtual channels (in the latter case the appropriate rate is identified by the requesting entity).

The update block 41 comprises three functional elements, namely an initial target determination element 45, an insert-if-free element 46, and a conflict resolution element 47. The initial target determination element 45 determines into which slot (the target slot) the VCN should be inserted to give the offset from the current slot appropriate for the transmission rate specified by the rate parameter identified in the request to the update block 41. The insert-if-free element 46 then examines this target slot and if it is free (as indicated by the type parameter of its entry 44), a valid entry is made in this slot. This is done by setting the type field to indicate the appropriate priority level for the VCN field and by inserting the VCN into the VCN field. If however, the target slot is already occupied by a valid VCN entry (a 'hit'), the conflict resolution element 47 is activated. This element 47 compares the priority levels associated with the occupying VCN entry and the VCN requiring insertion. If the latter has a higher priority level, it is inserted in the slot and the previously occupying entry now becomes the VCN requiring insertion; otherwise the occupying entry remains undisturbed and the original VCN requiring insertion remains the VCN requiring insertion. The conflict resolution element 47 then passes the VCN requiring insertion back to the insert-if-free element 46 but with a new target slot specified, this new target slot being the previous target slot incremented by one. Processing by the elements 46 and 47 is then effected iteratively until a free entry is found into which the VCN requiring insertion can be placed without triggering operation of the conflict resolution element 47.

The control of the operation of the GB scheduler 25 is effected by the list entry processor 40. This operation will be described in the next section.

Operation of the GB Scheduler

The operation of the GB scheduler 25 will now be described with reference to the VC state transition diagram of FIG. 3 and the flow chart of FIG. 4, the latter showing the sequencing of operations effected by the list entry processor 40.

The effect of the GB-related commands on the GB scheduler will first be considered.

When a GBSETUP command is received by the command processor 31 to set up a new virtual channel, a VC entry is made in the VC parameter memory 24 with the ON/OFF flag set to OFF, the state of the virtual channel set to STOP, and the NO-CELLS parameter set True; if the channel concerned is a GB1 virtual channel, its credit amount is set to the burst limit value BT. No entry is made for the virtual channel at this time in the list 27.

In due course, a GBSTART command will be received for the virtual channel. This command may have been preceded by a GBCELLS command causing the NO-CELLS parameter to be set False. If cells are available, receipt of the GBSTART command by the command processor results in the virtual channel state being changed to RUN and the update block 41 is requested by the command processor 31 to insert the virtual channel into the list 27 at peak rate offset. On the other hand, if no cells are available when the GBSTART command is received, the state of the channel is simply set to WAIT.

If the GBCELLS command is received when the virtual channel is in its WAIT state, the command processor 31 sets the NO-CELLS parameter to FALSE, changes the state of the virtual channel to RUN, and requests the update block 41 to insert the virtual channel into the list 27 at peak rate offset. If the GBCELLS command is received when the virtual channel (in this case, a GB1 channel) is in its ACCUM state, the command processor 31 sets the NO-CELLS parameter to FALSE and changes the state of the virtual channel to RUN (as the virtual channel is already in the list 27, the command processor does not request its insertion).

When the command processor 31 receives the GBSTOP command for a virtual channel, it sets the ON/OFF flag of the corresponding VC entry 44 to OFF. The processor 31 does not however change the state of the virtual channel or remove any corresponding entry from the list 27; this is done in due course by the list entry processor 40.

Finally, the GBRESET command results in the VC entry 44 for the specified virtual channel being reset.

Next the main operational task of the GB scheduler 25 will be considered, this being the entry processing task effected during each cell period for which control is passed to the GB scheduler by the main control block 33. This entry processing task is controlled by the entry processor 40, FIG. 4 being a flow chart depiction of the control effected by the processor 40.

Figure 4:
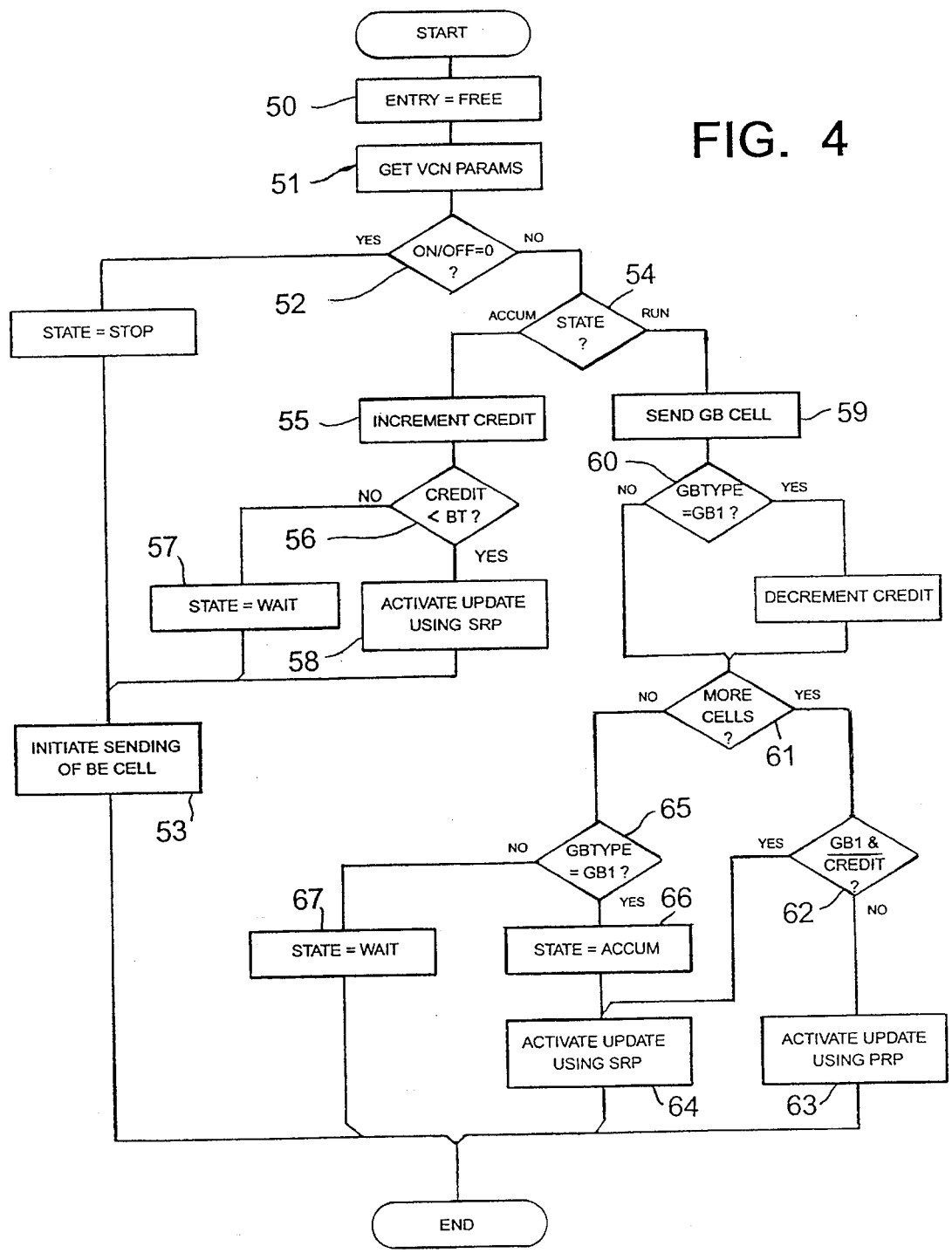
FIG. 4 is a flow chart illustrating the operation of a list entry processor of the guaranteed-bandwidth scheduler of FIG. 2.

The first operation carried out by the entry processor 40 upon being handed control, is to read the VCN in the entry held in the current list slot pointed to by the current slot tracker 28; at the same time, the entry processor frees this entry by setting its type field to '00' (see block 50 in FIG. 4). Next, the processor 40 reads the relevant VC parameters for the virtual channel concerned from the VC parameter memory 24 (block 51). The first VC parameter considered by the entry processor 40 is the ON/OFF parameter (block 52). If this parameter is set to OFF ('0'), then the processor recognises that the virtual channel concerned has been subject of a STOP command and the list entry just read is no longer valid. Accordingly, the processor 40 sets the state parameter for the channel to STOP in memory 24 and initiates the sending of a best effort cell by the best-effort organiser 30 for the current cell period (block 53). Of course, the VCN just read from the list 27 is not re-inserted in the list.

If the ON/OFF parameter indicates that the virtual channel is active, the entry processor then looks at the current state of the channel (block 54). Infact, valid entries in the list 27 can only relate to virtual channels in the RUN state or, additionally for GB1 channels, in the ACCUM state.

If the state parameter is set to ACCUM thereby indicating a GB1 virtual channel that has no cells to send but is accumulating credit, the entry processor 40 will next increment the credit value held in the credit field of the VC entry 42 for the channel concerned (block 55). If the total credit now equals the burst tolerance value BT (tested in block 56), the virtual channel state is changed to WAIT (block 57) and the VCN of the channel is not inserted back into the list 27. However, if the credit value is less than BT, the virtual channel is left in its ACCUM state and is reinserted in the list 27 at an offset determined by the SRP parameter; this reinsertion is effected by the update block 41 in the manner already described, at the request of the entry processor (block 58). The final step of dealing with a virtual channel in its ACCUM state, is to initiate the sending of a best effort cell by the best effort organiser 30 for the current cell period (block 53).

For a virtual channel found to be in its RUN state (block 54 test), the entry processor 40 initiates the sending of a cell (block 54) by outputting the VCN of the channel on line 19 to the send interface 13. Next, if the virtual channel is a GB1 channel (tested in block 60) its credit count held in the corresponding entry in memory 24 is decremented, unless already zero. Thereafter, the entry processor 40 determines whether the VCN of the channel should be re-inserted in the list 27. This involves determining if there are more cells remaining to be sent on the virtual channel (block 61); this information is available by checking to see if a 'No More Cells' signal has been supplied on line 20. In the case of there being more cells to send, then the VCN of the channel is reinserted into the list 27 at an offset determined by the peak rate parameter, PRP (block 63) except for GB 1 channels with no credit (tested for in block 62) which are inserted at an offset determined by the sustain rate parameter SRP (block 64). When there are no more cells available for sending, if the channel concerned is a GB1 channel (tested for in block 65), its state is set to ACCUM (block 66) and its VCN is reinserted in list 27 at an offset determined by the sustain rate parameter SRP (block 64) to enable the channel to accumulate credit. If the test in block 65 shows the channel to be a GB0 channel, its state is set to WAIT (block 67) and its VCN is not reinserted in the list 27.

Figure 3:
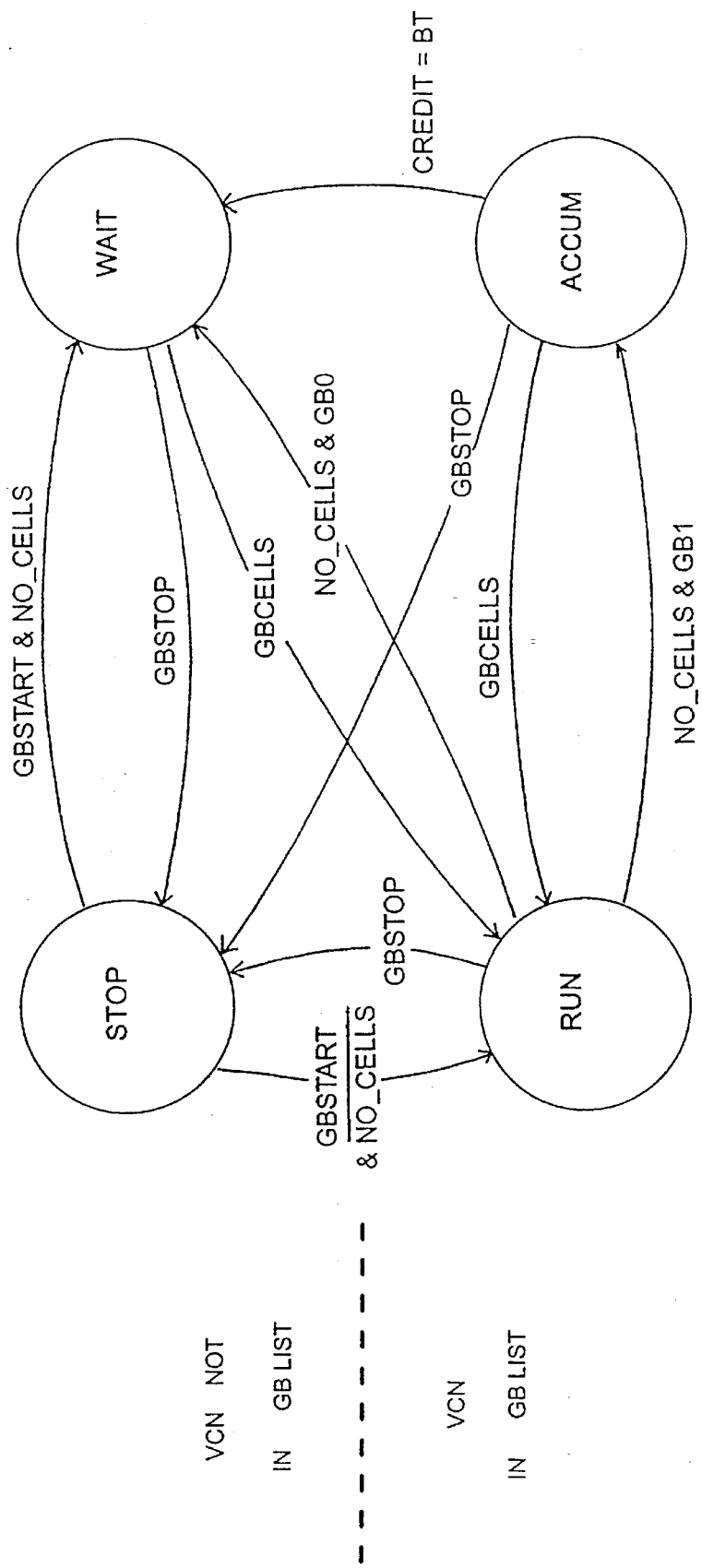
FIG. 3 is a state transition diagram showing the states of a virtual channel as managed by the FIG. 1 scheduler.

The above described virtual-channel state transitions caused by the GB commands and by the actions of the entry processor 40 are illustrated in FIG. 3.

It will be appreciated that the foregoing description is based on the functional components required of the scheduler and that these components may be implemented in any suitable manner. Infact, it will generally be desirable to implement the schedular in hardware in order to maximise throughput.

It will also be appreciated that many variations are possible to the described arrangement and the functional sub-elements may be associated differently. For example, although in the described arrangement it is the entry processor 40 that frees each list slot, this freeing could be considered as being effected by a separate functional element. Again, the test carried in block 36 by the main control 33 of the scheduler could equally be effected by the entry processor 40, the main control in this case merely determining whether the command processor 31 is to be activated or whether control should be passed straignht to the guaranteed bandwidth scheduler 25.

Another possible variant concerns the mechanism for determining when there are no cells remaining to be sent on a virtual channel. Rather than relying on feedback over the lines 16 and 20, the VC entry 42 in the parameter memory 24 could be used to keep a count of the cells remaining to be sent, each GBCELLS command specifying the number of new cells available and incrementing the cell count accordingly whilst the entry processor 40 decrements the cell count each time it initiates the sending of a cell on the virtual channel concerned.

Transmission Rate Parameters

As has already been described, the peak rate parameter PRP and sustain rate parameter SRP are used, as appropriate, by the initial target determination element 45 to determine the offset between the current list slot and the slot next to be associated with the virtual channel for which a cell has just been sent, in order to given a desired rate of cell transmission. The format of the PRP and SRP fields in each GB entry 42 in the VC parameter memory 24 are specified by the fields PRM and SRM respectively.

In one simple format, the PRP and SRP fields each specify a whole number of slots for the offset. The drawback with this arrangement is that as the desired rate increases, the control possible becomes coarser; in particular, it is not possible to specify a rate between one half and the full link bandwidth (these two rates corresponding to a slot offset of two and one respectively).

Figure 5:
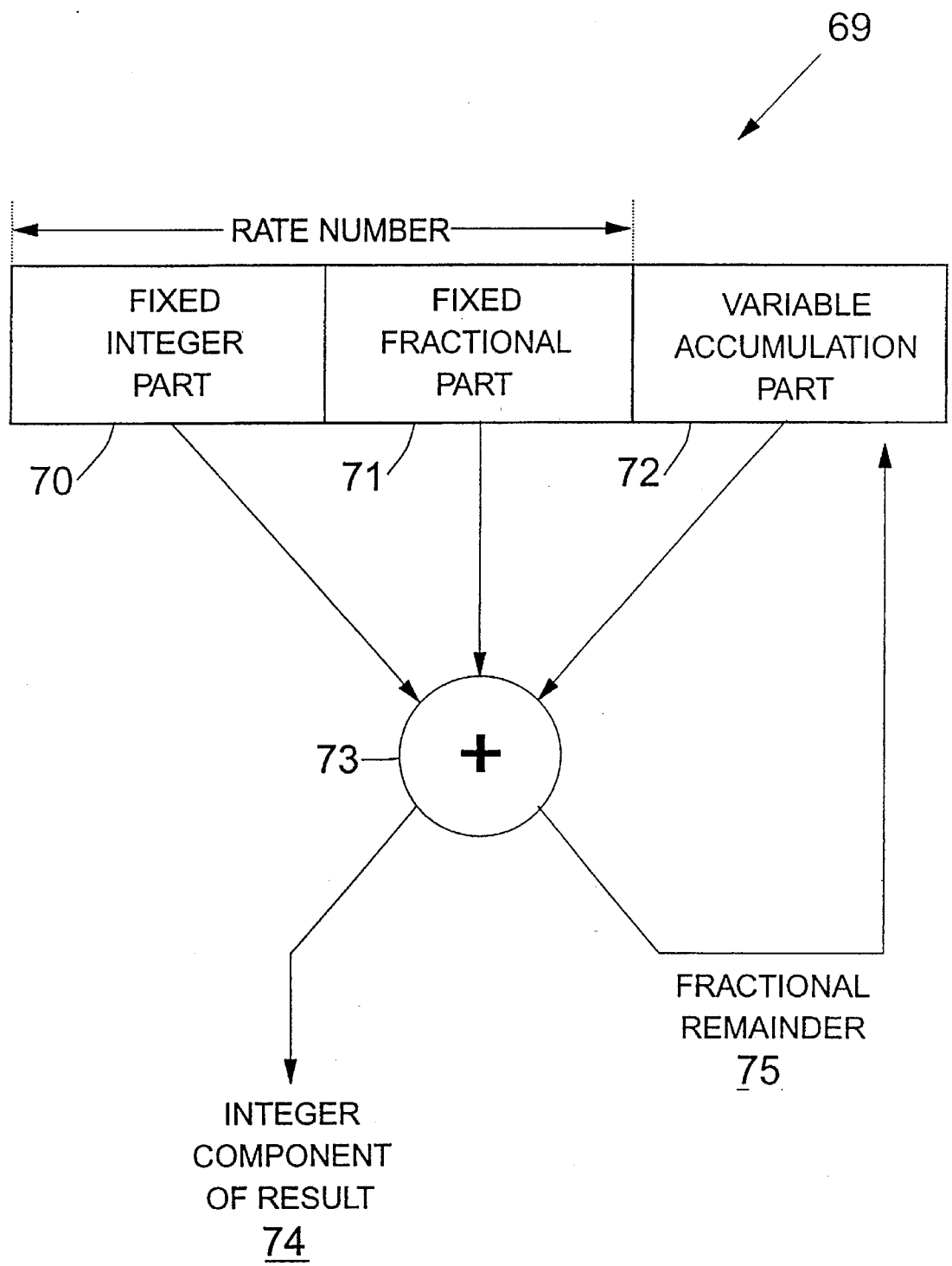
FIG. 5 is a diagram of a transmission rate indicator maintained for each virtual channel, the transmission rate indicator being used by the list entry processor to control the rate of cell transmission for the virtual channel concerned.

To overcome this drawback, the PRP and SRP are preferably specified in a more complex format (indicated by the PRM and SRM fields), this format being diagrammatically depicted in FIG. 5. In this case, the transmission rate parameter (PRP or SRP) 69 comprises three parts, namely a fixed integer part 70,
a fixed fractional part 71,
a variable accumulation part 72

The fixed integer part 70 and fixed fractional part 71 make up a rate number specifying the desired transmission rate in terms of the corresponding slot offset expressed as whole and parts slots (it being understood that the term "integer" in "integer part", refers not to the manner of number representation, but to the fact that this part represents a whole number of slots). As will become clear below, the accumulation part 72 holds a number representing a fraction of a slot.

Each time the initial target determination element 45 is requested to determine a target slot offset for a virtual channel, it adds together (see 73) the rate number 70, 71 and the accumulation part 72 of the appropriate transmission rate parameter. The integer component 74 of the result of this addition is then used to set the slot offset whilst the fractional remainder is stored back into the accumulation part 72.

In this way, the offset can be caused to vary so as to achieve a desired transmission rate. For example, if the integer part 70 is set to one and the fractional part to a half, the slot offset will alternate between one and two, giving a cell transmission rate of two thirds of the link bandwidth. Similarly making the integer part two and the fractional part a half, gives a cell transmission rate of 40% of the link bandwidth.

The transmission rate resolution achievable depends on the degree of precision permitted for specifying the three pans of the parameter 69. It will be appreciated that the exact form of storage of the integer and fractional pans 70, 71 of the rate number is not critical provided it is possible to translate the stored data into whole and partial slots.

In the scheduler of FIGS. 1 to 4, the SRP is also used for GB1 virtual channels to control the rate of credit generation. It is thus clear that the same form of parameter as illustrated in FIG. 5 can be used to control credit generation; of course, this mechanism for controlling credit generation can be used independently of the cell transmission rate control mechanism.

In fact, credit rate generation can be controlled using a control data item similar to that shown in FIG. 5, not only by varying the time between credit increment events (as described in the preceding paragraph) but also by varying the size of credit increment. Thus, each virtual channel for which credit was to be accumulated, could have its credit level incremented at fixed regular intervals, the amount of the increment being the integer component of an addition effected across all three parts of a control data item of the FIG. 5 form; in this case, however, the integer and fractional parts of the items represent whole and partial credits rather than slots.

I claim:

1. A method of regulating the transmission of cells onto a link, the cells being associated with a plurality of different virtual channels, the method comprising the steps of:

(a) providing for each virtual channel a control data item having a fixed integer part, a fixed fractional part, and a variable accumulation part;

(b) periodically determining for each virtual channel a control number, this determination involving:
        adding together said three parts of the control data item for the channel concerned to produce a result with an integer component and a fractional remainder;
        using the integer component of the result to set said control number; and
        storing said fractional remainder as said accumulation part of said control data item for the virtual channel concerned; and (c) regulating cell transmission for the virtual channel concerned according to the value of said control number determined in step (b) for the virtual channel.

2. A method according to claim 1, wherein said cells are transmitted onto the link in respective transmission time slots according to a transmission schedule associating transmission time slots and virtual channels; step (b) being performed for a particular virtual channel each time a cell is transmittted onto the link in respect of that channel, and the control number thereby determined being used in step (c) to update the transmission schedule by seeking to set as the next time slot for transmitting a cell for the virtual channel concerned, a time slot offset from the current one by a number of slots corresponding to said control number.

3. A method according to claim 1, wherein the transmission of cells for a particular virtual channel is dependent on the availability of transmit credits for that channel, said control number determined for each channel being used to regulate the rate at which credits are generated for the channel.

4. A method according to claim 3, wherein for each channel, each time step (b) is performed, a fixed credit increment is effected for the virtual channel concerned, said control number determined in step (b) being used to determine when step (b) is next to be performed for that virtual channel.

5. A method according to claim 3, wherein for each channel, step (b) is carried out at regular intervals, said control number determined being used to determine a size of credit increment for the channel concerned.

6. A method of controlling the rate of transmission of cells onto a link, the cells being associated with a plurality of different virtual channels and being transmitted onto the link in respective transmission time slots according to a transmission schedule associating transmission time slots and virtual channels; the method comprising the steps of:

(a) providing for each virtual channel a transmission rate indicator having a fixed integer part, a fixed fractional part, and a variable accumulation part;

(b) each time a cell is transmitted on the link in respect of a particular virtual channel according to said transmission schedule, determining for that virtual channel, at least in the case that another cell is available for sending on that channel, a desired next time slot for transmitting a cell for the channel, said desired next time slot being determined in terms of its offset, in slots, from the current time slot, this determination involving:
        adding together said three parts of the transmission rate indicator for the channel concerned to produce a result with an integer component and a fractional remainder;
        using the integer component of the result as said offset; and
        storing said fractional remainder as said accumulation part of said transmission rate indicator for the virtual channel concerned; and (c) updating the transmission schedule by using the offset determined in step (b), in determining the next time slot in which a cell is to be transmitted for the virtual channel concerned, and then associating that time slot with that channel.

7. A method according to claim 6, wherein said integer and fractional parts of each said transmission rate indicator are directly stored as numbers representing whole and partial time slots respectively.

8. A method according to claim 6, wherein the integer and fractional parts of each said transmission rate indicator are stored jointly in the form of a number representing the transmission rate it is desired to achieve, this number being converted into units and fractions of said time slots when determining said offset.

9. A method according to claim 6, wherein said virtual channels are assigned respective priorities and in step (c), in the event of the slot indicated by said offset being already associated with another virtual channel, a conflict resolution procedure is carried out based on the relative priorities of the channels concerned, the higher priority channel ending up being associated with that slot and the lower priority channel being thereafter associated with the first subsequent slot available.

10. A method of controlling the rate of transmit credit generation in a system in which cells associated with a plurality of different virtual channels are transmitted onto a link in respective time slots, the transmission of cells for a particular virtual channel being dependent on the availability of transmit credits for that channel; the method comprising the steps of:

(a) providing for each virtual channel a credit-generation rate indicator having a fixed integer part, a fixed fractional part, and a variable accumulation part;

(b) maintaining a list having entry slots for storing identifiers of the virtual channels to which credit is to be allocated; and (c) advancing through said list at a predetermined slot rate and each time a said identifier is encountered, increasing the transmit credit level of the corresponding virtual channel and reinserting said identifier in the list at a forward offset determined according to the following sub-steps:

adding together said three parts of the credit-generation rate indicator for the channel concerned to produce a result with an integer component and a fractional remainder;

using the integer component of the result to set said offset; and storing said fractional remainder as said accumulation part of said credit-generation rate indicator for the virtual channel concerned;

a conflict resolution procedure being carried out in the event that the position in said list indicated by said forward offset is already occupied.

11. A method of controlling the rate of transmit credit generation in a system in which cells associated with a plurality of different virtual channels are transmitted onto a link in respective time slots, the transmission of cells for a particular virtual channel being dependent on the availability of transmit credits for that channel; the method comprising the steps of:

(a) providing for each virtual channel a credit-increment size indicator having a fixed integer part, a fixed fractional part, and a variable accumulation part; and (b) at regular intervals, incrementing the transmit credit level of each virtual channel by a respective increment amount determined for that incrementing operation according to the following sub-steps:

adding together said three parts of the credit-increment size indicator for the channel concerned to produce a result with an integer component and a fractional remainder;

using the integer component of the result to set said increment amount; and storing said fractional remainder as said accumulation part of the 1 credit-increment size indicator for the virtual channel concerned.

12. Apparatus for transmitting a stream of cells onto a link, the cells being associated with a plurality of different virtual channels each of which is identified in the apparatus by a respective virtual-channel identifier (VCN); the apparatus including a scheduler for scheduling the transmission of cells of each virtual channel, said scheduler comprising:

storage means for storing for each virtual channel a transmission rate indicator having a fixed integer part, a fixed fractional part, and a variable accumulation part;

list means for maintaining a list having a number of entry slots each capable of storing a single VCN, the list containing the VCNs of virtual channels with cells to transmit;

control means for advancing through the list slot by slot and, if a VCN is found in the current slot of interest, responding thereto by transmitting a cell of the corresponding virtual channel, the control means being further operative to remove the VCN, if any, in the current slot of interest, and to re-insert the VCN in a slot offset ahead of the current slot by an predetermined offset amount, the control means including determination means for determining said offset amount, said determination means comprising:

means for adding together said three parts of the transmission rate indicator for the channel concerned to produce a result with an integer component and a fractional remainder, means for setting said offset amount in dependence on the integer component of the result, and means for storing said fractional remainder back into said storage means as said accumulation part of said transmission rate indicator for the virtual channel concerned;

the control means further including conflict resolution means for resolving conflicts arising from the slot that is offset from the current one by said predetermined offset, being already occupied by a VCN.

* * * * *